United States Patent [19]

Weinshenker

[11] 4,000,201

[45] Dec. 28, 1976

[54] OXIDATION STABILIZATION

[75] Inventor: Ned M. Weinshenker, Palo Alto, Calif.

[73] Assignee: Dynapol Corporation, Palo Alto, Calif.

[22] Filed: Oct. 4, 1974

[21] Appl. No.: 511,843

[52] U.S. Cl. .......................... 260/611.5; 260/465.1; 260/515 R; 260/526 N; 252/406

[51] Int. Cl.² .......................................... C07C 41/12

[58] Field of Search ................................ 260/611.5

[56] References Cited

UNITED STATES PATENTS 2,142,936   1/1939   Crawford et al. .............. 260/611.5

FOREIGN PATENTS OR APPLICATIONS 1,052,968   12/1966   United Kingdom ............ 260/611.5

OTHER PUBLICATIONS

Hamstead et al., Stabilizing Isopropyl Ether Against Peroxidation, Industrial & Eng. Chem., vol. 53, pp. 63A–66A, (1961).

*Primary Examiner*—James O. Thomas, Jr.
*Assistant Examiner*—G. Breitenstein
*Attorney, Agent, or Firm*—William H. Benz

[57] ABSTRACT

Organic liquids subject to oxidative decomposition, such as ethers, are stabilized against such decomposition by the addition of particulate, insoluble solid polymer resin to which is covalently bonded a plurality of oxidation active groups.

9 Claims, No Drawings

OXIDATION STABILIZATION

BACKGROUND OF THE INVENTION

1. Field of the Invention

This invention relates to a method for stabilizing organic solvents and monomers against buildup of oxidation products and to the stabilized products thereof.

2. The Prior Art

It is recognized that upon contact with oxygen (air) many organic liquids such as solvents and monomers undergo oxidation to form oxidic impurities. The most serious of these impurities are peroxides. When peroxides form in monomers such as styrene, acrylic acid and the like, they initiate and catalyze free radical polymerization of the monomer. When peroxides form in solvents such as ethers and tertiary hydrocarbons, they pose a serious hazard since the peroxides are explosive and can detonate when the solvent is heated. The problem has been especially notorious with diisopropylether.

One solution to this problem is to regularly distill solvents and/or monomers overhead from the peroxide contaminants. In both cases, this leads to expensive waste of materials, as deep bottom cuts must be taken and discarded. In the case of monomers, there is the problem that polymerization may occur within the distillation column.

The other conventional solution to this problem is to add a chemical to the solvent or monomer which inhibits the formation of undesired oxidation products such as peroxides. Typical prior art inhibitors (stabilizers) include tetraethylenepentamine p-aminophenol, and sodium diethyldithiocarbamate, all of which materials are soluble in the solvent or monomer being stabilized. While these materials are generally used in small amounts (often as little as one part per million [1 ppm] or even less), their presence in solvents or monomers can be a problem if an ultrapure solvent is required in chemical syntheses or in biological studies. In monomers, they offer the disadvantage of requiring the addition of extra catalyst or initiator to compensate for their presence. Their removal can only be effected by distillation with its inherent problems.

STATEMENT OF THE INVENTION

A new class of oxidation inhibitors for organic liquids has now been found which eliminates the contamination problems inherent in stabilizers and inhibitors of the prior art. The new inhibitors are particulate solids which can be easily segregated from the liquid solvents or monomers by simple settling, screening, or filtering. In accord with this invention, a liquid organic solvent or monomer which is subject to oxidative decomposition is stabilized by adding to it a stabilizing amount of particulate, insoluble, solid polymer resin having covalently bonded thereto a plurality of oxidation active groups. The product which results from this process, an organic solvent or monomer subject to oxidative decomposition containing a stabilizing amount of a particulate, insoluble solid polymer resin having covalently bonded to it a plurality of oxidation active groups, is also an aspect of this invention.

DETAILED DESCRIPTION OF THE INVENTION

Reference to Related Applications

Certain of the materials employed as oxidation inhibitors herein are described as intermediates and in other uses in U.S. Pat. Ser. No. 456,731 filed Apr. 1, 1974, now U.S. Pat. No. 3,928,293 by Guy A. Crosby, and in U.S. Pat. Ser. No. 479,654 filed June 17, 1974, now U.S. Pat. No. 3,959,190 by Ned M. Weinshenker.

The Solid Insoluble Stabilizers.

The stabilizer materials employed in this invention are particulate organic solids which are insoluble in organic liquids. The stabilizers are further characterized as comprising a cross-linked organic polymeric resin backbone carrying a plurality of oxidation active groups. An "oxidation active group" is defined and used herein as an organic chemical moiety which prevents the buildup of undesired oxidation products in monomers or solvents either by preventing their formation or by reacting with them after their formation. The primary undesirable oxidation products in solvents or monomers are peroxides, so at the principle "oxidation active" groups are groups which prevent the buildup of peroxides.

The oxidation active groups employed in these stabilizers fall into two classes: Sulfide moiety-containing groups of the formula

wherein $n$ is an integer and has a value of from 0 to 10 and R is a hydrocarbon group of from 1 to 18 carbon atoms; and, phenol amine moiety-containing groups of the formula

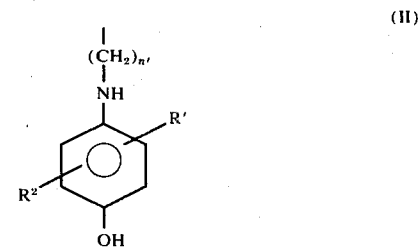

wherein $n'$ is an integer which has a value of from 0 to 10 and $R'$ and $R^2$ independently are hydrogen or lower alkyls of up to about eight carbon atoms.

Examples of suitable oxidation active groups include:

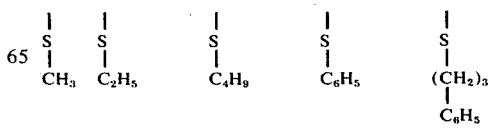

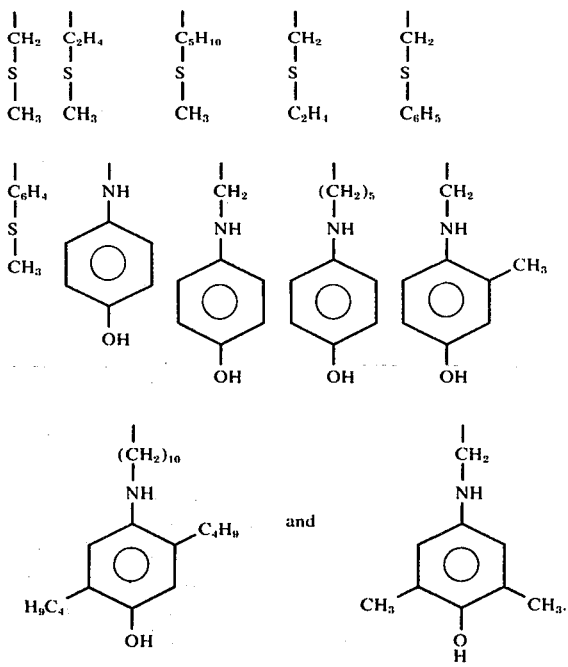

Preferably, when groups of Formula I are employed, $n$ has a value of 0, 1, 2, 3 or 4 and R is a lower hydrocarbon of from 1 to 8 carbon atoms. Most preferably $n$ has a value of 0 or 1 and R is a methyl, ethyl, or propyl group.

Preferably, when groups of Formula II are employed, $n'$ has a value of 1, 2, 3, or 4 and R' and $R^2$ independently are hydrogen or lower alkyls of from 1 to 4 carbon atoms. Most preferably $n'$ has a value of 1 or 2 and R' and $R^2$ are each hydrogens.

Combinations of two or more of these groups may be employed, if desired. However, for ease of production, use of single groups is generally most attractive.

The oxidation active groups are covalently bonded to a polymer backbone to form an insoluble agent. The polymer backbone is a cross-linked polymeric organic resin, preferably a macroreticular cross-linked polymeric organic resin. The term "macroreticular" defines that the resin is macroporous and that it has a high specific surface area. The pores should have average diameters of at least 100 A. The specific surface area (measured by the B.E.T. method) should be at least about 1 $M^2/g$. Preferably, pore diameters have an average value of from about 200 A to 2,000 A, while specific surface areas preferably range from about 4 $M^2/g$ to 300 $M^2/g$. The polymer backbones may include polyalkyl materials such as polypropylene, polyethylene, or polycyclopentadiene, and polyaromatic materials such as polystyrene, polymethylstyrene, and the like. Polystyrene is preferred as a backbone polymer. Not only does it offer a chemically excellent substrate to which to attach the peroxide active groups, but it also is readily available in forms very suited for stabilizer use.

The backbone polymer is cross-linked. This ensures the stabilizer's insolubility in all conventional organic liquid solvents and monomers. In accordance with this invention a stabilizer is to be considered "insoluble" if its solubility in the organic liquid is less than 0.001%, basis solvent. Suitably the backbones contain from 0.1 to 10 cross-links for each 100 carbon atoms. These cross-links can occur directly between polymer chains or they can be effected via added linking groups. In this case of the preferred polystyrene backbones, a simple and preferred way to introduce cross-links is to copolymerize minor amounts of divinylbenzene with the styrene. Generally, amounts of divinylbenzene ranging from 0.2 to about 8% (basis styrene) are useful, with amounts of from about 0.5 % to about 5% being preferred.

The macroreticular structure of the polymeric backbone offers a number of distinct advantages: 1) Its porous nature provides access to the inner areas of solid particles of stabilizer, both to peroxide-active groups when forming the solid stabilizer and to peroxides when the stabilizers are being used; 2) It has a solid (not gel) structure, so it is easy to separate; and 3) It undergodes only moderate swelling in organic liquids.

Preparation

Conceptually, these reagents can be prepared either by forming a monomeric oxidation active group and polymerizing it into the desired polymer product, or by taking a preformed polymeric backbone and so treating it to covalently attach the active groups. Both routes are within the purview of this invention. In practice, because of the desire to have backbones of set characteristics, it is generally preferred to use the preparation wherein a preformed polymer is treated. An exemplary method for this preparation involves first halogenating a suitble polymer with molecular bromine or chlorine in the presence of a catalyst such as thallic acetate sesquihydrate or ferric chloride, and thereafter treating the halogenated polymer with a metal alkyl such as n-butyllithium and with alkyldisulfide to afford the polymeric sulfide reagent, or with a suitable aminophenol to afford the aminophenol group reagent. These sequences will be elaborated upon in the Examples, but are presented merely as a representative preparative scheme.

Oxidation Active Group Content

The oxidation active groups are covalently atached to the polymer backbone. In the case of the preferred polystyrene backbones, this attachment is directly from the oxidation active groups to carbons on the aromatic ring, preferably the aromatic carbons which are para to the links between the styrenes. In general, it is desirable that as many oxidation active groups are incorporated into these polymers as possible and should be controlled. Generally, oxidation active group contents of at least 0.1 mmole/gram of finished polymer are suitable, with a maximum of about 10 mmoles/gram being achievable. In the case of polystyrene-based materials, about 4–7 mmoles of oxidation active group/gram of product is equivalent to one active group attached to each aromatic ring, depending upon the exact size of the active group, and it is preferred to have between about 0.2 and 6 mmoles of active groups present per gram of product.

Use of the Stabilizers

The solid stabilizer materials find use in organic liquids, particularly solvents and monomers, as oxidation inhibitors. Examples of organic liquids which can be stabilized by these materials include ethers, both linear and cyclic, such as diethyl ether, diisopropyl ether, dibutyl ether, and tetrahydrofuran; hydrocarbons containing tertiary carbon atoms, such as isobutylene and cumene, and free-radical polymerizable monomers such as styrene. acrylic acid, methacrylic acid, acrylonitrile, and other vinyl compounds, This list is merely representative. As a rule, the present solid insoluble materials may find application in any of the monomers or solvents which require stabilization by conventional soluble polymerization inhibitors. In a preferred application, the inhibitors are used to stabilize lower ethers, especially diethyl and diisopropyl ethers.

In use, the solid insoluble stabilizers are placed in intimate contact with the liquid being stabilized. This may be done by mixing particles of solids as such with the liquid. This may also be done by placing the particles in a mesh or screen bag or compartment with which the liquid is in contact. This latter embodiment has the advantage that the particles of inhibitor automaticaly separate from the liquid when desired.

The amount of solid inhibitor employed will generally be at least as great, on a weight basis, as the amount of soluble inhibitor employed. Amounts of from about 1 part per billion (basis organic liquid) to about 1% (basis organic liquid) may be employed, with amounts from about 10 parts per billion to about 0.1% by weight being preferred.

The invention will be further illustrated by the following Examples, which are not intended to limit the invention's scope.

EXAMPLE I

A. Preparation of poly (p-bromostyrene)

The procedure of F. Camps et al. Tet Let 1713-14 (1971), was followed. To 13.0 g (125 mmoles) of macroreticular polystyrene (Amberlite XE-305, Rohm-Haas) and 27.6 g (67.5 mmoles) of thallic acetate sesquihydrate suspended in 200 ml of carbon tetrachloride was added dropwise with stirring 12.8 g (4.1 ml; 80 mmoles) of bromine (as $Br_2$) in 30 ml of carbon tetrachloride and the mixture then stirred at 50°–60° until all bromine color disappeared. The beads were filtered and washed with the following: 1) a mixture (1:1) of 30% aqueous HCl and dioxane; 2) a mixture (1:1) of water and dioxane; 3) dioxane; 4) THF; and 5) ether. The air-dried beads were further dried in vacuo (ca. 0.1 mm/Hg) at 50°–0° overnight. The polymer weighed 21.2 g (82.0% yield). The brominated polystyrene was refluxed in 500 ml of 0.1 N aqueous HCl solution, then in 50% aqueous dioxane and finally in dioxane. The elemental analysis of vacuum dried (ca. 0.1 mm Hg) beads indicated 65% of the theoretical bromine (3.56 mmoles Br/g).

B. Preparation of Poly (p-methylmercaptostyrene)

To a stirred suspension of 14.5 g (51.6mmoles) of poly (p-bromostyrene) in tetrahydrofuran (200 ml) was added at −78° C under argon 50 ml of 2.28 M n-butyllithium hexane (114 mmoles) solution and the stirring was continued at −78° C for 0.5 hr. and then at room temperature for 1 hour. The tetrahydrofuran solution was drawn from the polymer by syringe. The beads were recharged at −78° C with 150 ml of THF and 30 ml of 2.28 M n-butyllithium (68.4 mmoles), and stirred at room temperature for 1 hour. The tetrahydrofuran was removed again, whereupon the polymer beads were treated with 200 ml THF and 20 ml of methyldisulfide (distilled), stirred at −78° C for 15 minutes and at room temperature for one-half hour and then refluxed under argon for 1 hour. The cooled mixture was diluted with 100 ml of water and filtered. The beads were washed with the following solvents: 1) water; 2) a 3:1 mixture of dioxane/water; and 3) dioxane. Finally, the beads were refluxed in dioxane for one-half hour and the dioxane was distilled off until the distillate reached the boiling point (100°C) of dioxane. The elemental analysis of the vacuum-dried beads (70° C, overnight), 11.4 g, gave 54% of the theoretical sulfur incorporation (3.56 mmoles S/g).

EXAMPLES II–IV

The preparation of Example I, parts A and B, was repeated, varying the starting polymeric resin. Macroporous polymethylstyrene, polypropylene, and polycyclopentadiene are employed and yield final products containing about 3 mmoles of sulfur per gram.

EXAMPLES V–VII

The preparation of Example I is repeated, substituting other sulfur-containing materials for methyldisulfide. Ethyldisulfide and propyldisulfide and pentyldisulfide are employed, yielding products wherein R (in Formula I) is ethyl, propyl and pentyl respectively.

EXAMPLE VIII

To the stirred ice-cold suspension of 20 g of chloromethylated (5.0 mmole Cl/g) macroreticular polystyrene (Rohm-Haas, Xe-305) in 40 ml of a mixture of THF and HMPT was added dropwise 11.0 g (10 mmole) of p-aminophenol dissolved in 30 ml HMPT and the resulting mixture was stirred at room temperature overnight (12 hours). The mixture was filtered, and the beds were washed with water, a 1:1 mixture of dioxane and water, dioxane and ether. The vacuum (aspirator)-dried beads were further dried on a Sohxlet apparatus equipped with a Dean-Stark water remover under argon using a degassed 2:1 mixture of benzene and dioxane.

EXAMPLE IX

Polystyrene (21.2 g) in the form of 20–40 mesh cross-linked beads are stirred with 13.4 g of aluminum chloride and 37.8 ml of chloromethyl methyl ether in 146 ml of dichloroethylene. The reaction is monitored by ultraviolet absorbance and continued until the polystyrene is chloromethylated to

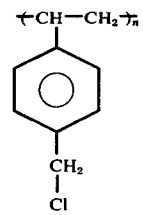

This product is separated, washed, and dried, a 10 g portion is suspended in 100 ml of tetrahydrofuran and 30 ml of hexamethylphosphoric triamide. The mixture is cooled to 0° and treated with 14.5 ml of aqueous potassium methyl sulfide. Additional hexamethylphosphoric triamide is added until the aqueous phase is substantially reabsorbed. The mixture is heated to 50°–60° C for 12 hours, cooled, filtered, and washed with base, water, cold HCl/dioxane, water/dioxane, and dioxane and ether. The product is dried to yield poly(vinyl)benzylmethylsulfide

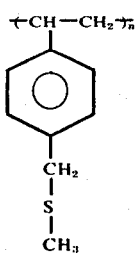

Analysis of this material shows that it contains 15.72% by weight of sulfur.

EXAMPLE X

A cross-linked polysulfoxide polymer of the formula

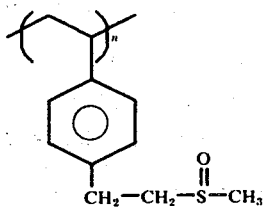

is produced following the procedures of Ayres and Mann if Polymer Letters, Volume 3 (1965), pages 505–508. This polymer is then subjected to reduction with four equivalents per equivalent of polymer of lithium aluminum hydride in ether, as is taught by Bordwell and McKellin in JACS, Volume 73 (1951), page 2251, to yield a cross-linked, insoluble sulfide polymer of the formula

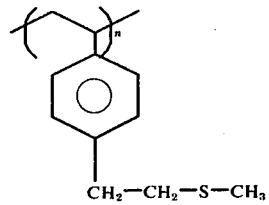

EXAMPLE XI

The effectiveness of the present polymeric materials was evaluated. The product of Example IX (hereinafter polymer 1) and the product of Example VIII (hereinafter polymer 2) were tested as inhibitors in peroxide-free and peroxide-containing diethyl and diiospropyl ethers. Tables I and II summarize the scope and status of the experimenytal study. Data indicating the extent of peroxide formation in diethyl ether and diisopropyl ether after three months of storage at room temperature are recorded in the appropriate columns.

TABLE I

EFFECT OF POLYMER SUPPORTED INHIBITORS AND KNOWN INHIBITORS ON ETHERS CONTAINING PEROXIDE

| Ether | Inhibitor | g/l | t0 | Peroxide (mEq/ml) t1 1 Mo. | t2 2 Mo. | t3 3 Mo. | t3/t0 |
|---|---|---|---|---|---|---|---|
| diethyl* | None(control) | — | 0.044 | 0.148 | 0.215 | 0.215 | 4.89 |
| " | Tetraethylene-pentamine | 0.32 | 0.044 | 0.040 | 0.039 | 0.041 | 0.93 |
| " | p-aminophenol | 1.0 | 0.044 | 0.044 | 0.043 | 0.044 | 1.00 |
| " | polymer 1 | 1.0 | 0.044 | 0.043 | 0.048 | 0.050 | 1.14 |
| " | polymer 2 | 1.0 | 0.044 | 0.038 | 0.039 | 0.040 | 0.91 |
| diisopropyl** | None (control) | — | 0.004 | 0.004 | 0.006 | 0.011 | 2.75 |
| " | Tetraethylene-pentamine | 0.32 | 0.004 | 0.002 | 0.003 | 0.005 | 1.25 |
| " | p-aminophenol | 1.0 | 0.004 | 0.003 | 0.005 | 0.006 | 1.50 |
| " | polymer 1 | 1.0 | 0.004 | 0.002 | 0.004 | 0.007 | 1.75 |
| " | polymer 2 | 1.0 | 0.004 | 0.002 | 0.003 | 0.006 | 1.50 |

*Aged Mallinckrodt Anhydrous
**Aged J. T. Baker, reagent grade

TABLE II

EFFECT OF POLYMER SUPPORTED INHIBITORS AND KNOWN INHIBITORS ON PEROXIDE-FREE ETHERS

| Ether | Inhibitor | t | Peroxide (mEq/ml) t1 1 Mo. | t2 2 Mo. | t3 3 Mo. |
|---|---|---|---|---|---|
| diethyl* | None (control) | — | nil | 0.004 | 0.014 | 0.026 |
| " | Tetraethylene-pentamine | 0.32 | nil | nil | nil | nil |
| " | p-aminophenol | 1.0 | nil | nil | 0.001 | 0.002 |
| " | polymer 1 | 1.0 | nil | 0.002 | 0.002 | 0.003 |
| " | polymer 2 | 1.0 | nil | 0.001 | 0.001 | 0.001 |
| " | sodium diethyl-dithiocarbamate | 0.000005% | nil | nil | 0.001 | 0.003 |
| diisopropyl** | None (control) | — | nil | nil | 0.001 | 0.005 |
| " | Tetraethylene-pentamine | 0.32 | nil | nil | nil | nil |
| " | p-aminophenol | 1.0 | nil | nil | 0.001 | 0.001 |
| " | polymer 1 | 1.0 | nil | nil | 0.001 | 0.001 |

TABLE II-continued

EFFECT OF POLYMER SUPPORTED INHIBITORS AND
KNOWN INHIBITORS ON PEROXIDE-FREE ETHERS

| Ether | Inhibitor | | t | Peroxide | | (mEq/ml) |
| --- | --- | --- | --- | --- | --- | --- |
| | | | | t1 1 Mo. | t2 2 Mo. | t3 3 Mo. |
| " | polymer 2 | 1.0 | nil | nil | nil | 0.001 |

*Mallinckrodt Anhydrous, reagent grade, freshly distilled.
**J. T. Baker, reagent grade, freshly distilled.

All ethers were stored in culture tubes, tightly sealed with teflon-lined screw caps at room temperature, unprotected from light. It was seen that the polymeric materials gave good results.

I claim:

1. An organic liquid subject to oxidation decomposition consisting of lower alkyl liquid linear ethers stabilized against said oxidative decomposition by containing a stabilizing amount in the range of from 1 part per billion to 1 percent by weight (basis liquid) of particulate, insoluble, solid cross linked polymeric organic resin having covalently bonded thereto a plurality of sulfide moiety-containing groups of the formula

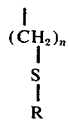

wherein $n$ is an integer having a value of from 0 to 10 inclusive and R is a hydrocarbon group of from 1 to 18 carbon atoms inclusive.

2. The liquid of claim 1 wherein said resin is a polystyrene resin.

3. The liquid of claim 2, wherein $n$ is an integer of from 0 to 4 inclusive and R is a hydrocarbon group of from 1 to 8 carbon atoms.

4. The liquid of claim 3, wherein said liquid is diethyl ether or diisopropyl ether.

5. The liquid of claim 4, wherein $n$ is 0 or 1 and R is a methyl group.

6. A lower alkyl ether selected from the group consisting of diethyl ether and diisoproyl ether stabilized against oxidative decomposition by containing aa stabilizing amount of particulate, insoluble, solid cross linked polymeric organic resin having covalently bonded thereto a plurality of sulfide moiety-containing groups of the formula

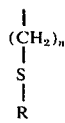

wherein $n$ is an integer having a value of from 0 to 10 inclusive and R is a hydrocarbon group of from 1 to 18 carbon atoms inclusive.

7. The lower alkyl ether of claim 6 wherein said resin is a macroreticular resin.

8. The lower alkyl ether of claim 7 wherein said resin is a polystyrene resin.

9. The lower alkyl ether of claim 6 wherein the ether is diisopropyl ether.

* * * * *